United States Patent [19]

Campanini

[11] 4,412,693
[45] * Nov. 1, 1983

[54] SWIVEL HOSE COUPLING WITH THREADED NIPPLE

[76] Inventor: Sergio Campanini, 224 E. Miller Rd., Iola, Kans. 66749

[*] Notice: The portion of the term of this patent subsequent to Aug. 10, 1999, has been disclaimed.

[21] Appl. No.: 288,710

[22] Filed: Jul. 31, 1981

[51] Int. Cl.³ ............................................. F16L 33/22
[52] U.S. Cl. ..................................... 285/39; 285/174; 285/243; 285/272
[58] Field of Search ............... 285/272, 251, 243, 174, 285/39

[56] References Cited

U.S. PATENT DOCUMENTS

| | | | |
|---|---|---|---|
| 409,066 | 8/1889 | Ravenel | 285/243 |
| 708,117 | 9/1902 | Bowers | 285/243 |
| 3,073,628 | 1/1963 | Cline et al. | 285/243 |
| 3,191,975 | 6/1965 | La Marre et al. | 285/243 |
| 3,222,091 | 12/1965 | Marshall | 285/243 X |
| 3,367,681 | 2/1968 | Braukman | 285/174 X |
| 4,288,110 | 9/1981 | Grenell | 285/174 |
| 4,343,498 | 8/1982 | Campanini | 285/272 X |

FOREIGN PATENT DOCUMENTS

| | | | |
|---|---|---|---|
| 71525 | 12/1942 | Czechoslovakia | 285/251 |
| 421928 | 6/1948 | Italy | 285/251 |
| 972105 | 10/1964 | United Kingdom | 285/272 |
| 1215980 | 12/1970 | United Kingdom | 285/256 |

*Primary Examiner*—Dave W. Arola
*Attorney, Agent, or Firm*—Dowell & Dowell

[57] ABSTRACT

A swivel coupling for terminating the end of a hose made of resilient material, the coupling having a tubular nipple with a barbed hose receiving portion at one end and a cylindrical end extending from the hose and having an O-ring seal extending therearound, and the coupling including a screw threaded fitting surrounding the cylindrical end of the nipple and sealed thereto by the O-ring and having an annular abutment adjacent to the hose, and the coupling further including an annular collar, separable into sectors in the form of shell portions which surround the hose and squeeze it against the barbed nipple, the collar having a grooved structure overlying the annular abutment of the screw fitting and retaining the fitting close to the hose while permitting it to swivel with respect to its axis, and the nipple having female wrench flats in its outer end and having external screw threads at its inner end beyond the barbed portion whereby the nipple can be screwed into the hose bore after the screw fitting and collar have been assembled to it.

6 Claims, 5 Drawing Figures

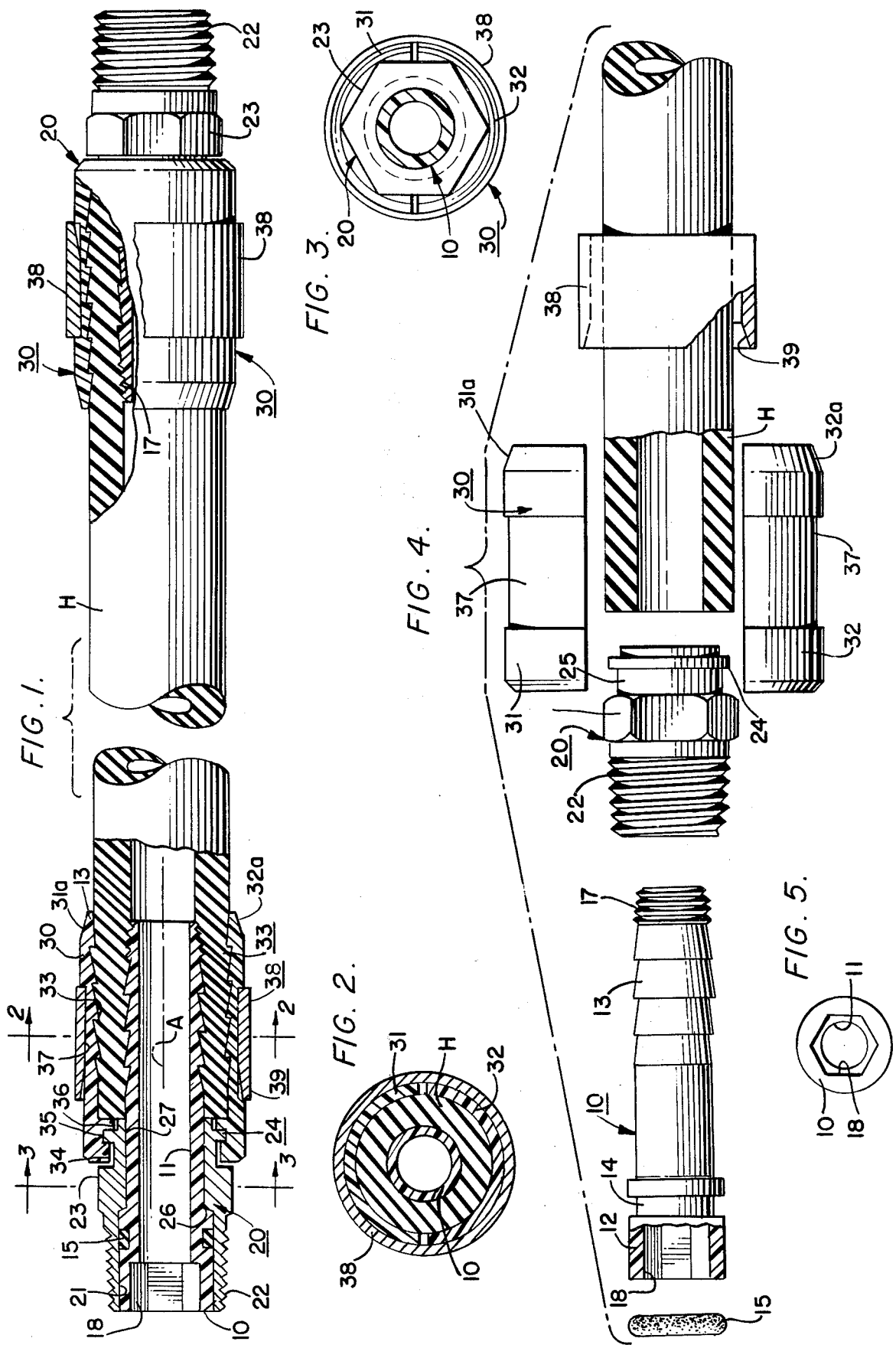

SWIVEL HOSE COUPLING WITH THREADED NIPPLE

BACKGROUND AND PRIOR ART

There are many patents showing hose couplings for terminating a hose of the type used for air brake pressure lines, gasoline lines, water hoses, etc. However, in most cases those hose couplings which would be the most satisfactory are relatively expensive to manufacture. Therefore a less expensive type of hose coupling is often used which is not entirely satisfactory, since it may not adequately secure the hose to the nipple and/or screw fitting of the coupling.

Efforts to overcome prior art disadvantages have often resulted in a complex and expensive coupling using a large number of parts which require complicated machining, and which can only be assembled using special tools. Moreover, most couplings provide no interengagement between the ferrule and the screw threaded fitting, whereby all of the strain tending to pull the hose out of the coupling must be borne by the barbs on the nipple. The applicant is not aware of any prior art showing the combination on a nipple including annular barbs to provide fluid tight sealing, a threaded portion to make it easier to screw the nipple into the bore of a hose, and wrench flats inside the central opening of the nipple to receive a tool by which the nipple can be rotated during insertion thereof into the bore of the hose.

THE INVENTION

The invention comprises an improved swivel coupling for connection with the end of a resilient hose, and including a tubular nipple having an outer surface which includes an annular barbed portion terminated by a threaded end which is insertable by screwing into the bore of the hose, and a cylindrical portion which extends beyond the hose and is received in the central passage of a screw threaded fitting having a cylindrical internal wall receiving the cylindrical portion of the nipple and sealed thereto by an O-ring. The central opening of the nipple has female wrench flats located near the outer end of the nipple which is remote from its threaded inner end, and operative to receive a tool by which the nipple can be rotated while screwing its threaded end into the hose bore. The surrounding screw fitting has a threaded portion extending away from the hose with external wrench flats adjacent to the threaded portion, the fitting also having an annular abutment extending around the fitting and located away from the threaded portion. The swivel coupling further includes an annular collar which is divided longitudinally of the coupling to provide multiple sectors or shell portions, which when assemblied together form a substantially annular internal surface having ribs therearound which are located such that when the hose is located within the shell portions and the latter are clamped tightly thereon, the annular ribs will clamp the hose securely to the barbed portion of the nipple. The collar also has an end portion which has an internal annular retaining member shaped to overlie and rotatably engage the tubular abutment of the screw fitting, thereby providing a sort of tongue and groove interengagement operative to prevent longitudinal separation of the screw fitting from the collar.

OBJECTS AND ADVANTAGES OF THE INVENTION

It is a principle object of this invention to provide a swivel coupling wherein the nipple is especially firmly anchored inside the bore of the hose, and wherein there is an additional annular interlocking structure between the collar which compresses the hose against the barbed end of the nipple and the screw threaded fitting of the assembly, so that the mechanical integrity of the engagement between the hose and the coupling is independent of the fluid-tight integrity therebetween, the coupling being greatly strengthened by such additional arrangements.

It is another major object of the invention to provide a swivel coupling in which the fluid-tight integrity of the coupling is provided by an annular seal between the cylindrical end of the nipple and the internal cylindrical passage through the threaded fitting; and it is a further object to provide a swivel coupling in which the fluid-tight seal between the nipple and the threaded fitting is independent of the torque required to seat the threaded fitting during installation.

Still another important object of the invention is to provide inside the opening of the tubular nipple female wrench flats facing away from the hose receiving portion of the nipple and adapted to receive a tool which can be inserted therein and rotated to screw the threaded end of the nipple into the hose bore during installation. There are two ways to assemble these parts to form a completed coupling on the end of a hose. First, during factory assembly of the hose and coupling, the screw fitting is slipped onto the nipple and the hose receiving end of the nipple is then pushed into the hose. Afterward, the shell segments of the annular collar are assembled about the hose and the screw fitting, and then the shell segments are compressed on the hose and the band is forced onto the segments using a special tool. However, the coupling can be fitted to the hose in a second way which can be done in the field without any special assembling tools. This is done by using a different sequence of operations wherein the screw fitting is placed against the end of the hose, and the shell segments are assembled around the hose and interlocked with the abutment on the screw fitting. The band is then slipped onto the segments and is tight enough to keep them assembled. Thereafter the hose receiving end of the nipple is lubricated and inserted through the screw fitting into the end of the hose. An Allen wrench is then inserted into the female flats in the outer end of the nipple and used to screw the nipple right into the hose until its outer end is flush with the outer end of the screw fitting, whereupon the assembly is completed.

It is a further object of the invention to provide a collar which is longitudinally divided into multiple sectors comprising identical shell portions which are chamfered to receive an encircling band for compressing the collar onto the hose. This type of construction provides a coupling which can be made less expensively and which is easier to install at the end of a hose.

Other objects and advantages of the invention will become apparent during the following discussions of the drawing.

THE DRAWING

FIG. 1 is an elevation view partly in cross section showing a length of hose having a swivel coupling according to the invention located at each end;

FIG. 2 is a section view taken along line 2—2 of FIG. 1;

FIG. 3 is a section view taken along line 3—3 of FIG. 1;

FIG. 4 is an exploded view showing a swivel coupling according to the present invention ready for installation to a hose; and FIG. 5 is a section view taken along line 5—5 of FIG. 4.

PREFERRED EMBODIMENT

Referring now to the drawings, the Figures show a length of hose H to which a swivel coupling is connected. The coupling comprises a tubular nipple 10 having a central opening 11 extending therethrough, and having on its outer surface a cylindrical portion 12 near one end and a hose receiving portion including a screw threaded portion 17 at is other end with an annular barbed portion 13 located therebetween. In the vicinity of the cylindrical end 12, there is an external annular groove 14 in which an annular seal 15 such as an O-ring is inserted, and there are female wrench flats 18 in the central opening.

The coupling further includes a screw threaded fitting 20 having a passage 21 through its center which comprises a cylindrical wall portion snuggly receiving the cylindrical portion 12 of the nipple 10, and sealing against the O-ring 15. The fitting 20 further includes a threaded portion 22 which faces away from the hose H and has external wrench flats 23 of hexagonal shape located adjacent to the threaded portion 22. Near the end of the fitting 20 which is located adjacent to the hose, the fitting includes an annular abutment 24 which in the illustrated embodiment comprises an annular ring around the body 25 of the fitting, although the shape of the abutment 24 need not necessarily be cylindrical. The internal cylindrical wall portion 21 of the fitting 20 is stepped as at 26 to a smaller internal diameter 27, and this shoulder 26 lies against the annular shoulder 16 around the nipple as can be seen in FIG. 4, thereby providing on the two parts interfering means which prevent the nipple 10 from being pulled all the way through the threaded fitting 20.

The hose H is compressed tightly between the barbed portion 13 of the nipple 10 and an annular collar 30 which is divided longitudinally of the axis A of the fitting, thereby dividing the collar into multiple sectors comprising shell portions such as 31 and 32 as can be seen in FIG. 4. Although only two such shell portions are shown in the drawings, it is to be understood that the collar 30 can be divided into three or more shell portions as may be desired. The collar 30 and its shell portions 31 and 32 have annularly ribbed internal surfaces 33 which are designed to provide an undulating engagement with the outer surface of the hose H and squeeze it onto the the barbed portion 13 of the nipple 10. Moreover, the collar 30, when assembled, has an annular internal retaining structure which is labeled 34, 35, and 36 in FIG. 1 and is designed to surround the abutment ring 24 of the fitting 20 and thereby hold it against longitudinal displacement in the direction of the axis A with respect to the collar 30 and the hose H. The structures 34, 35 and 36, taken with the abutment ring 24, provide a sort of annular tongue and groove arrangement which permits rotation of the fitting 20 with respect to the collar 10 during coupling to, or removal from, some other mating fitting (not shown).

The shell portions 31 and 32 of the annular collar 30 are held tightly pressed against the hose H by a band 38 which surrounds the shell portions of the collar 30 and fits into an annular groove 37. It will be noted that the band 38 is large enough to overlie the hose H and freely slide thereon, and that the shell portions 31 and 32 are beveled at the ends 31a and 32a to match a bevel 39 located internally at one end of the band 38. When the shell portions 31 and 32 are being installed on the hose during mass production, they are mechanically squeezed onto the outer periphery of the hose H by a special tool (not shown) tightly enough so that the band 38 can be forced over the shell portions and into the groove 37 by applying axial thrust to the band 38, whereby to drive its tapered portion 39 upwardly onto the bevels 31a and 32a of the shell portions of the collar 30. After the band 38 has been snapped into the groove 37 around the collar 30, the collar is then allowed to expand slightly outwardly against the band, the diameter of the band being such as to maintain proper compression between the collar, the hose, and the hose receiving outer surface 13 of the nipple 10. Thus, once the swivel coupling has been fully installed upon the hose H, the only part which undergoes any substantial distortion from its original shape is the hose H because the nipple, and the band 38 and the collar 30 are substantially rigid and nondeformable.

During the alternative method of assembly, which can be done in the field without special tools, the shell portions can be assembled first around the hose and screw fitting and held in place by the band 38, and then the nipple can be screwed into the hose through the screw fitting and installed shell portion, thereby internally expanding the hose outwardly to fill the shell portions as the nipple enters deeper into the bore of the hose.

Although it is an advantage of the invention that the nipple 10 and the collar 30 can be made of plastic, as shown in the preferred embodiment, there is no reason why these parts cannot be made of metal or any other suitable material which is dimensionally stable and non-corrodable. The threaded fitting 20 is preferably made of brass or some other non-corrodable metal, whereas the band 39 can be made of steel suitably protected on its outer surface by plating.

The present invention is not to be limited to the exact embodiments shown in the drawings, for obviously changes can be made within the scope of the following claims.

What is claimed is:

1. A swivel coupling for terminating the end of a resilient hose having a bore therethrough, the coupling comprising:
   (a) a tubular nipple having a central opening therethrough and having an outer surface including a cylindrical portion near one end and a hose receiving portion near the other end, the hose receiving portion having a threaded end of diameter slightly greater than the diameter of the hose bore and having an annularly barbed portion between the threaded end and the cylindrical portion, and the central opening through the nipple having therewithin female wrench flats in the vicinity of said cylindrical portion;
   (b) a screw fitting having a passage therethrough with a cylindrical wall portion snuggly receiving the cylindrical portion of the nipple, and the fitting having a threaded portion extending away from said hose receiving portion of the nipple.

(c) interfering means carried by the fitting and by the nipple and operative to keep the fitting rotatably engaged on said cylindrical portion of the nipple; and (d) means for surrounding the hose and the hose receiving portion of the nipple to compress the hose on said annular barbed portion.

2. The swivel coupling as claimed in claim 1, wherein the fitting has an annular abutment extending therearound adjacent to the hose; and wherein said means for surrounding the hose comprises an annular collar divided longitudinally into multiple shell portions, the collar when its shell portions are assembled having an internal surface having annular ribs therearound sized to receive the hose and to clamp it tightly onto the barbed portion of the nipple, and the collar having at one end an internal annular retaining member shaped to rotatably engage the annular abutment of the screw fitting; and means for retaining the shell portions assembled and tightly clamped on the hose.

3. The swivel coupling as claimed in claim 2, wherein said annular abutment on the screw fitting and said annular retaining member on the collar comprise annular tongue and groove means mutually interengaging to prevent longitudinal separation of the fitting from the collar.

4. The swivel coupling as claimed in claim 1, wherein the cylindrical wall portion of the passage of the screw fitting is larger in the vicinity of the threaded portion and steps to a smaller diameter in the vicinity of the abutment, and the cylindrical portion of the nipple is a snug sliding fit on said larger portion and steps down to the hose receiving portion of the nipple which is sized to pass through said smaller portion of the fitting, the step in the fitting lying against the step on the nipple and comprising said interfering means.

5. The swivel coupling as claimed in claim 1, wherein one of said cylindrical portions has an annular groove therein facing toward the other cylindrical portion, and seal means in said annular groove.

6. The swivel coupling as claimed in claim 1, wherein the outer diameter of the threaded end of the nipple is at least as great as the outer diameter of the barbed portion.

* * * * *